(12) United States Patent
Vohlgemuth

(10) Patent No.: US 10,097,061 B2
(45) Date of Patent: Oct. 9, 2018

(54) ROTARY ELECTRIC MACHINE EQUIPPED WITH A TERMINAL BOX

(71) Applicant: MOTEURS LEROY-SOMER, Angouleme (FR)

(72) Inventor: Patrick Vohlgemuth, La Rochefoucauld (FR)

(73) Assignee: MOTEURS LEROY-SOMER, Angouleme (FR)

( * ) Notice: Subject to any disclaimer, the term of this patent is extended or adjusted under 35 U.S.C. 154(b) by 859 days.

(21) Appl. No.: 14/411,884

(22) PCT Filed: Jun. 28, 2013

(86) PCT No.: PCT/IB2013/055330
§ 371 (c)(1),
(2) Date: Dec. 29, 2014

(87) PCT Pub. No.: WO2014/002071
PCT Pub. Date: Jan. 3, 2014

(65) Prior Publication Data
US 2015/0188381 A1    Jul. 2, 2015

(30) Foreign Application Priority Data

Jun. 29, 2012  (FR) .................................... 12 56269

(51) Int. Cl.
H02K 5/22       (2006.01)
H02K 11/30      (2016.01)
H02K 11/33      (2016.01)

(52) U.S. Cl.
CPC ............. H02K 5/225 (2013.01); H02K 11/30 (2016.01); H02K 11/33 (2016.01)

(58) Field of Classification Search
CPC .... H02K 11/33; H02K 5/225; H02K 11/0068; H02K 11/30; F04B 35/04; F04B 39/06
See application file for complete search history.

(56) References Cited

U.S. PATENT DOCUMENTS 5,192,888 A    3/1993  Fleer
5,637,829 A    6/1997  Nakamura et al.
(Continued)

FOREIGN PATENT DOCUMENTS

| CA | 853379 A | 10/1970 |
| CN | 2724284 Y | 9/2005 |
| DE | 100 05 505 A1 | 8/2001 |
| EP | 1 133 012 A2 | 9/2001 |
| EP | 2 011 704 A2 | 1/2009 |
| FR | 1 092 897 A | 4/1955 |
| FR | 2 698 134 A1 | 5/1994 |
| FR | 2 778 796 A1 | 11/1999 |
| FR | 2 958 113 A1 | 9/2011 |
| JP | A-57-25133 | 2/1982 |

(Continued)

OTHER PUBLICATIONS

Translation of Dec. 31, 2014 International Report on Patentability issued in International Patent Application No. PCT/IB2013/055330.
(Continued)

*Primary Examiner* — Michael Andrews
*Assistant Examiner* — Leda Pham
(74) *Attorney, Agent, or Firm* — Oliff PLC

(57) ABSTRACT

A rotary electric machine has a machine casing and a terminal box fitted to the casing, the terminal box having a base part, the latter defining at least: a fixing zone for fixing at least one electronic module, this fixing zone having one or more support elements for receiving fasteners for fixing the module or modules, an electrical connection zone, the latter having at least one block of material for receiving at least one electrical connection element, the support element or elements and the block or blocks of material being molded as a single piece with the base part.

24 Claims, 7 Drawing Sheets

(56) References Cited

U.S. PATENT DOCUMENTS

Figure 1:
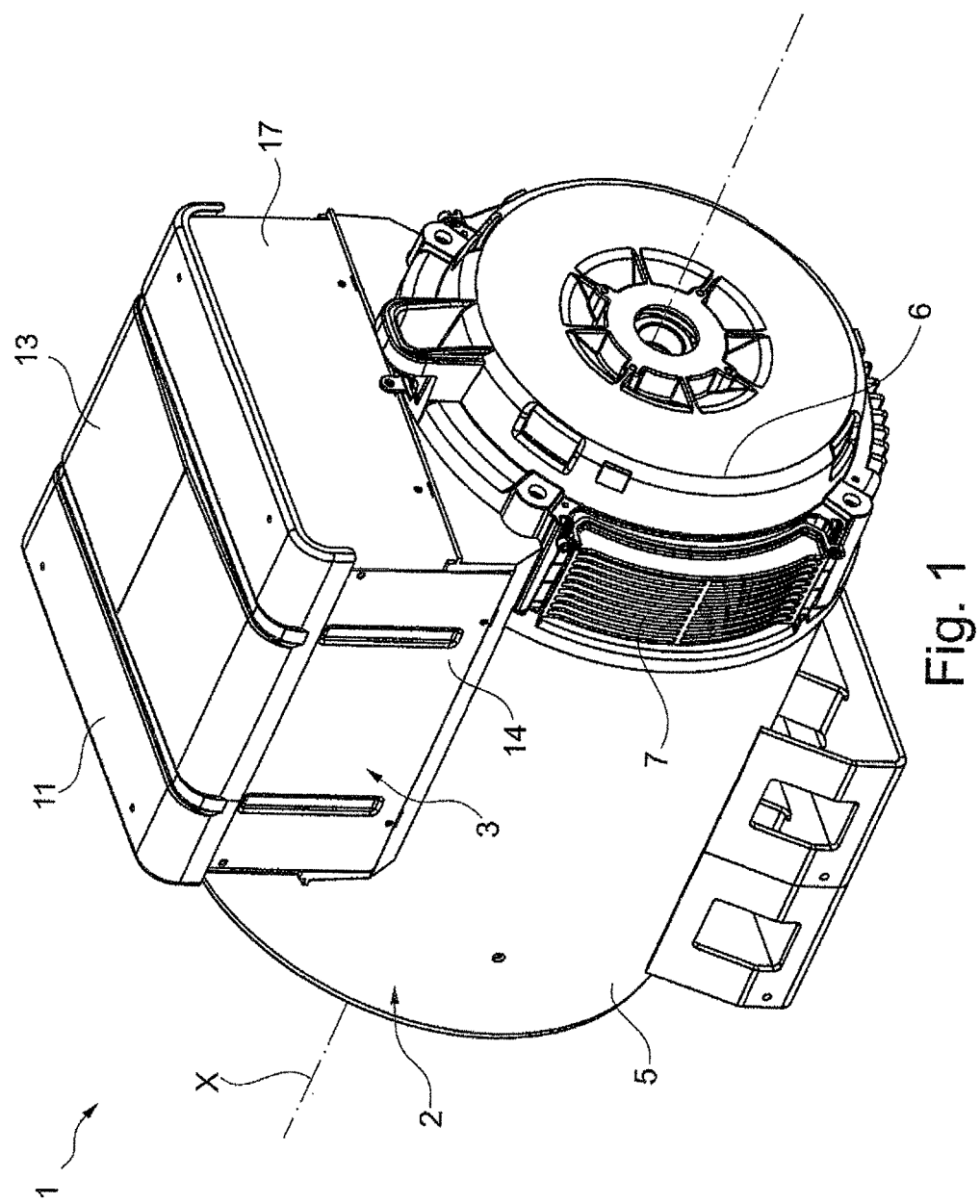

| | | | |
|---|---|---|---|
| 5,769,659 A | 6/1998 | Ceylan | |
| 6,002,083 A | 12/1999 | Workman | |
| 6,828,704 B2 | 12/2004 | Okamoto et al. | |
| 6,916,213 B2* | 7/2005 | Nyblin | H01R 4/304 |
| | | | 439/709 |
| 7,009,318 B2* | 3/2006 | Iritani | F04B 35/04 |
| | | | 310/52 |
| 7,932,649 B2* | 4/2011 | Dubuc | H02K 11/048 |
| | | | 310/68 D |
| 8,777,591 B2* | 7/2014 | Cho | F01C 17/066 |
| | | | 417/366 |
| 2002/0050752 A1* | 5/2002 | Katsuzawa | H02K 5/225 |
| | | | 310/71 |
| 2009/0010787 A1 | 1/2009 | Nakazawa et al. | |
| 2012/0286630 A1* | 11/2012 | Tomizawa | H02K 11/33 |
| | | | 310/68 D |

FOREIGN PATENT DOCUMENTS

| | | |
|---|---|---|
| JP | A-05-083899 | 4/1993 |
| WO | WO 2008/019818 A1 | 2/2008 |
| WO | WO 2011/091668 A1 | 8/2011 |

OTHER PUBLICATIONS

Oct. 15, 2013 International Search Report issued in International Patent Application No. PCT/IB2013/055330.

Apr. 11, 2013 Search Report issued in French Patent Application No. 1256269 (with translation).

* cited by examiner

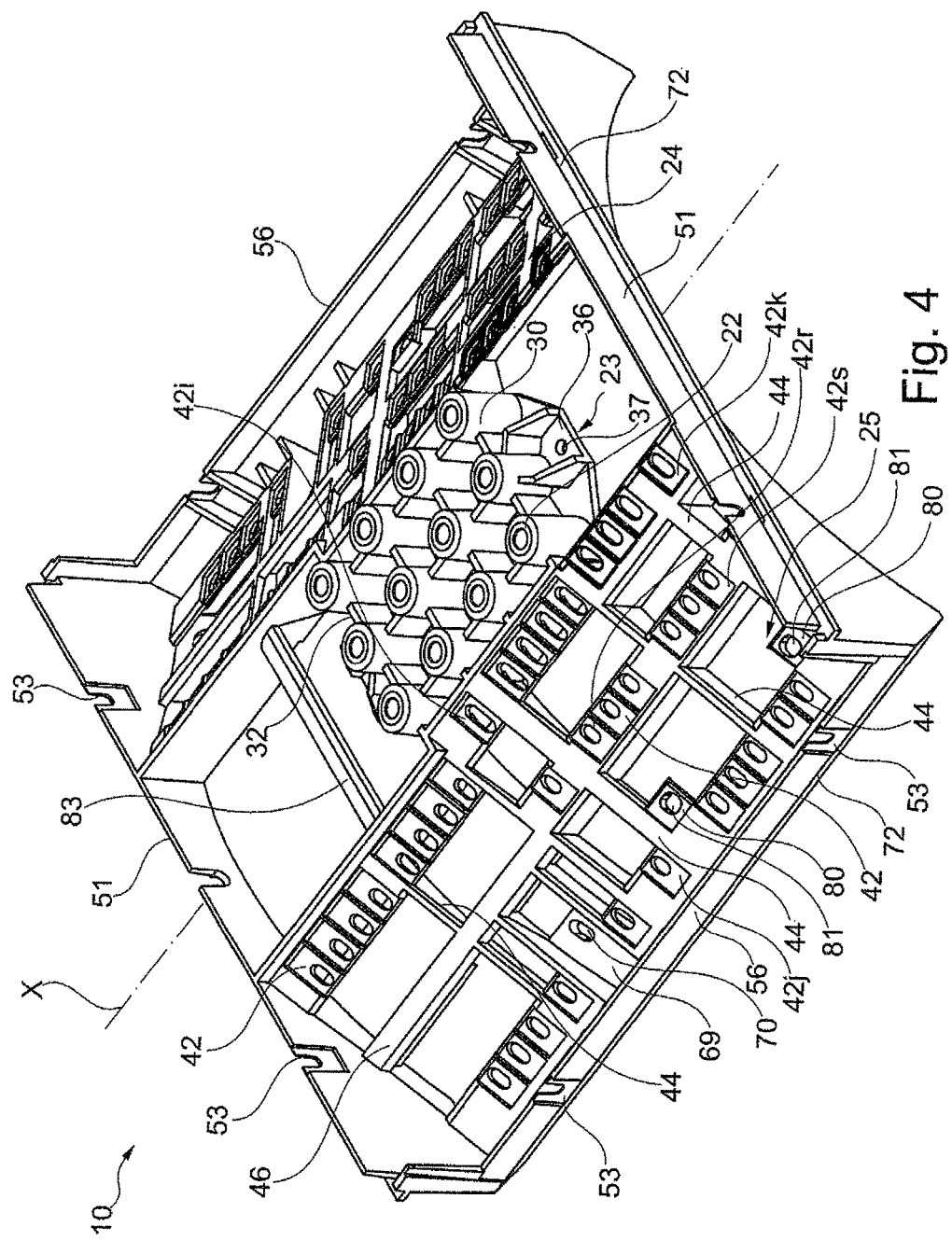

ROTARY ELECTRIC MACHINE EQUIPPED WITH A TERMINAL BOX

The present invention relates to rotary electric machines equipped with boxes able to receive electrical connections of the machine and/or of the electronic modules, such as voltage regulators for example.

Such boxes are known as "terminal boxes". They are generally attached to the casing of the machine towards the top thereof.

EP 1 133 012 describes a terminal box of an electric motor comprising:
- a base made of plastic, comprising contact pieces with plugs set into the base through a moulding operation, electric control components,
- a protective lid.

The terminal box defines an external plug-in connection for connection to the mains.

Patent CN2724284Y teaches how to produce a terminal box in glass fibre reinforced plastic, this box being made up of two parts fixed together using bolts.

Application FR 2 958 113 discloses a terminal box of an electric machine, which could potentially house a regulator, comprising two half-shells assembled with one another, and one or several cable passages formed by the removal of one or several removable parts.

U.S. Pat. No. 5,192,888 relates to a terminal box arranged on the casing of an electric motor and comprising a base and a lid, the base hugging the shape of the casing.

U.S. Pat. No. 6,002,083 describes a motor terminal box formed by assembling two shells along a plane that is substantially oblique, and U.S. Pat. No. 5,637,829 describes a box a wall of which has lines of weakness that can easily be cut to form an opening suited in size to the size of the cables that are to be introduced.

U.S. Pat. No. 6,828,704 discloses a terminal box for an electric motor that has a hole in one of its panels to accommodate cables which are connected to internal conductors via a support fixed to the base.

Application WO 2011/091668 describes a system that allows a terminal box to be mounted on a motor.

U.S. Pat. No. 5,769,659, application CA 85 33 79, patent FR 1 092 897, applications JP 5083899 and JP 57 025 133 and patent application FR 2 778 796 disclose other examples of terminal box.

EP 2 011 704 A2 discloses a headlamp cleaner electric pump defining an external electrical plug for the electrical connection of the motor. There is no provision for accessing the inside of the box for electrically connecting the pump once the box has been manufactured.

WO 2008/019818 A1 discloses a circulation pump with an electrical external plug-in connector. There is no provision for accessing the inside of the box after the pump has been manufactured.

Almost all terminal boxes for industrial alternators are constructed by assembling multiple metallic elements.

Making and assembling these metallic elements are painstaking operations and require the implementation of a great number of screwing elements as well as the addition of supports to hold the various electronic modules specific to each electric machine inside the terminal box.

The mechanical interface between the terminal box and the casing of the machine often requires the creation of fairly complex shapes. In these interface zones, the dimensional spread on the assembly process often introduces significant preload and, under the effect of vibrational loadings, sheet metal work elements may suffer fatigue failure.

When the electric machine is an alternator associated with a combustion engine that drives it, to form an electricity generator set, a control cabinet is generally provided. Different manufacturers have different ways of mounting these cabinets which may, for example, be located on top of the alternator, on the side or sides, or on the rear. Whatever position is adopted, access to the inside of the junction box needs to be possible and as easy as possible so that a voltage regulator contained within it can, for example, be adjusted.

There is a need to simplify the manufacture of terminal boxes for electric machines, notably by reducing the number of component parts in order to lean towards standardization, while at the same time keeping the fatigue strength of the box and the access to the inside of the box the same ones, or even improving them.

In a first of its aspects, the invention therefore relates to a rotary electric machine comprising a machine casing and a terminal box fitted to the casing, the terminal box comprising a base part, the latter defining at least:
- a fixing zone for fixing at least one electronic module, this fixing zone comprising one or more support elements for receiving fasteners for fixing the module or modules,
- an electrical connection zone, the latter comprising at least one block of material for receiving at least one electrical connection element, the support element or elements and the block or blocks of material being moulded as a single piece with the base part.

By virtue of the invention, the terminal box becomes easier to manufacture and its constituent elements and contents become easier to assemble. The base part may provide all of the interfaces between the casing of the machine and all of the electronic modules and allow the fitting of a cover.

The fixing zone where the electronic module or modules is or are fixed comprises one or more support elements to receive the fasteners for fixing the module or modules, the fastener or fasteners preferably being clip nuts. The electronic module or modules can thus be held firmly within the fixing zone using the fasteners accepted by the support element or elements. The modules and their various options can be fitted with ease, without the addition of mounting plates or added-on fixing supports.

The support elements offer an almost unlimited number of layout configurations, according to the requirements of the electric machine.

The number of support elements is preferably greater than or equal to two, so as to allow at least one module to be fixed to two support elements.

When the electric machine comprises several electronic modules, the support elements on which one electronic module rests differ from those on which the other module or modules rest or rests.

The support element or elements are preferably pre-holed; the support element or elements advantageously comprise at least one extra hole, once the electronic module or modules is or are in place; and the holes are preferably distributed over substantially their entire length.

The fasteners may include clip nuts and the support element or elements may include housings that make them easier to position, such as recesses of substantially rectangular outline.

The electronic module or modules may be chosen from voltage regulators and speed variators, and the or at least one of the electronic modules may be connected to electric conductors of the rotary electric machine, preferably via the electrical connection element or elements.

The connection zone may comprise a plurality of blocks of material arranged at regular intervals in at least one direction or, better still, in two mutually perpendicular directions.

The electrical connection element or elements may comprise threaded metal inserts allowing the configuration of the electrical connections to be adapted to suit the various electrical couplings (4-wire, 6-wire, 12-wire, etc.). Each threaded metal insert may accept a threaded stud to which are fitted one or more terminal clips connected to electric conductors, these terminal clips being held on the stud using (a) nut(s). The threaded metal inserts are thus, advantageously, internally threaded female inserts.

The base part may be overmoulded onto the female inserts.

The connecting zone may be central and the base part preferably defines at least two fixing zones arranged one on each side of the central connecting zone, notably on the lateral sides of the base part.

The base part is preferably symmetric with respect to a longitudinal median plane.

The machine may comprise a cover fixed to the base part, this cover preferably comprising at least one removable individual panel that can be detached from the terminal box without fully removing the cover.

The cover may comprise front and rear panels, lateral panels and a lid, it being possible for all of these elements to be removed relative to one another to make for easier access in various configurations of the electric generator set for example.

The base part may comprise housings accepting fasteners used to fix the cover to the base part.

The cover may be made of metal.

In particular, the panels and/or the lid may be made of rectangular steel plates to minimize the manufacturing time and offcuts of material.

The casing is preferably of cylindrical shape, the axis of the cylinder preferably being horizontal. The base part is preferably fitted to the lateral surface of the cylinder, notably the upper part thereof.

According to another advantageous feature of the invention, the base part is moulded from a thermoplastic material, possibly reinforced with a mineral filler. That allows all the complexity in the shape of the terminal box to be concentrated in a component that is made of moulded plastic and therefore easy to produce.

In addition, because of the plasticity of the material from which it is made, the base part very easily absorbs the dimensional variations of the casing of the machine and therefore considerably reduces the risk of fatigue damage.

The terminal box may have no external electrical connection plug. Access to the electrical connection zone entails opening the terminal box.

Electrical connection can be made using electrical connectors coming in from outside the machine and connecting inside the terminal box in the electrical connection zone. A sealed cable lead-through with a grommet may be provided through one wall of the terminal box.

Figure 2:
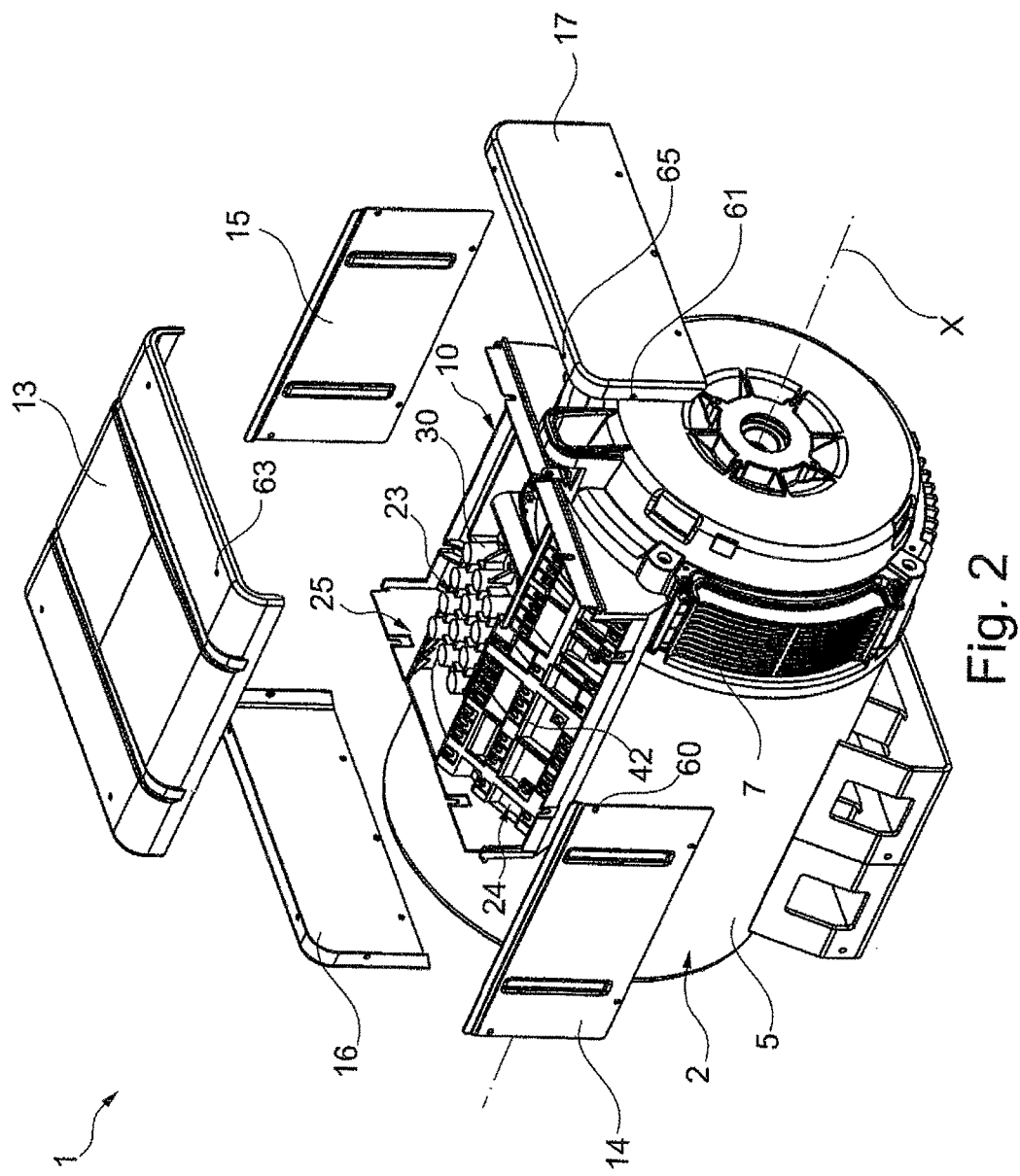
Figure 3A:
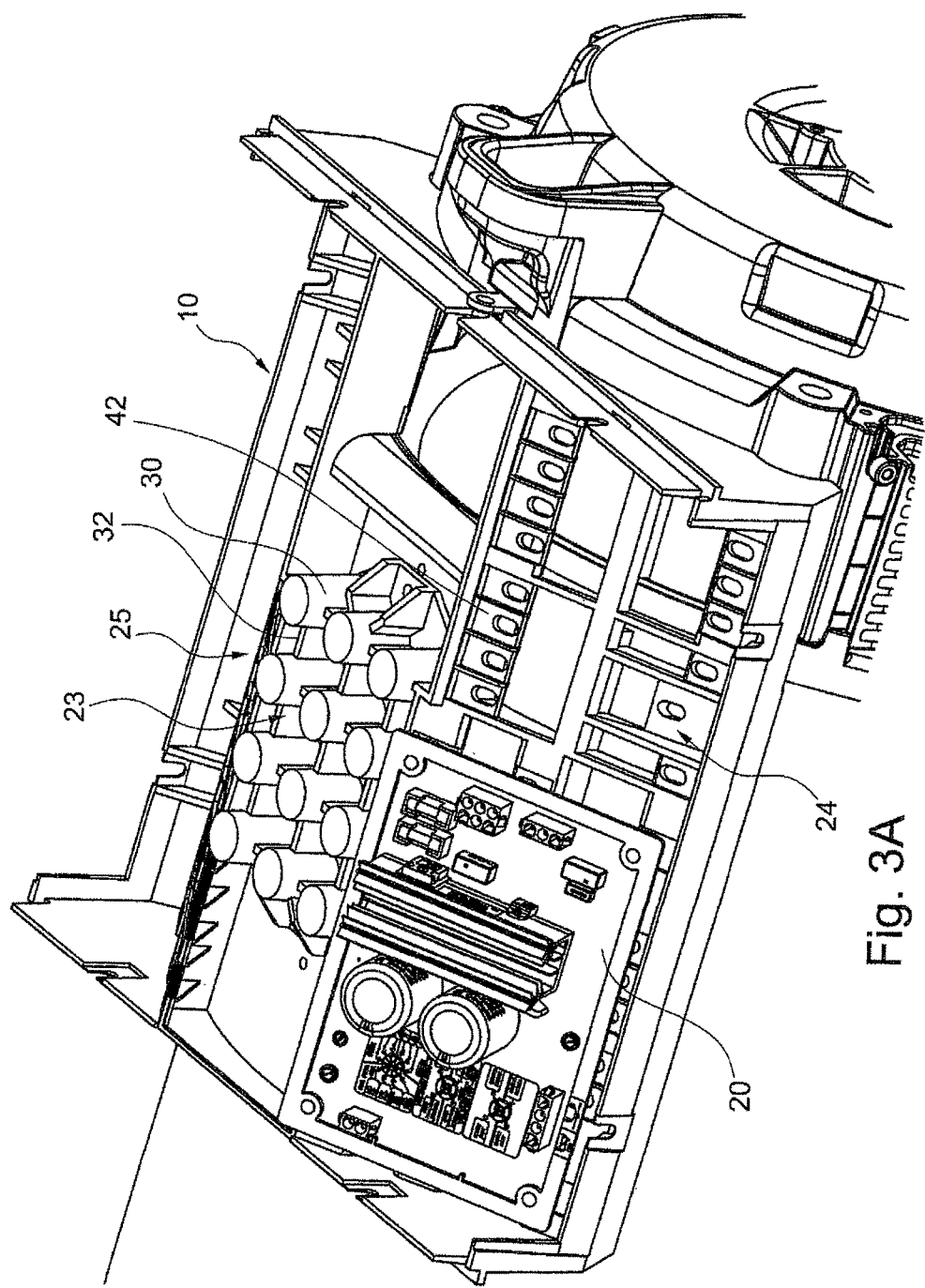
Figure 3B:
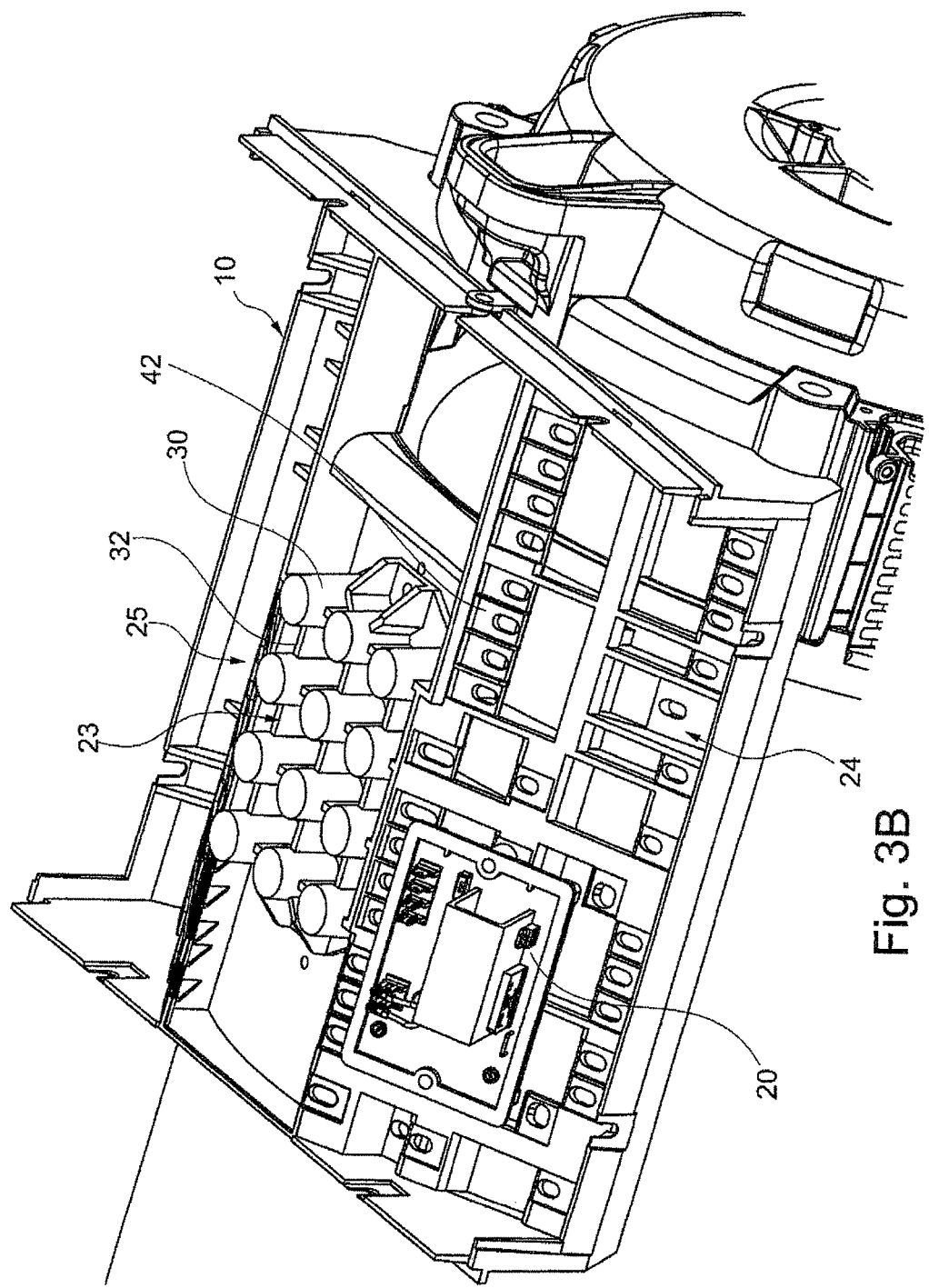
Figure 3C:
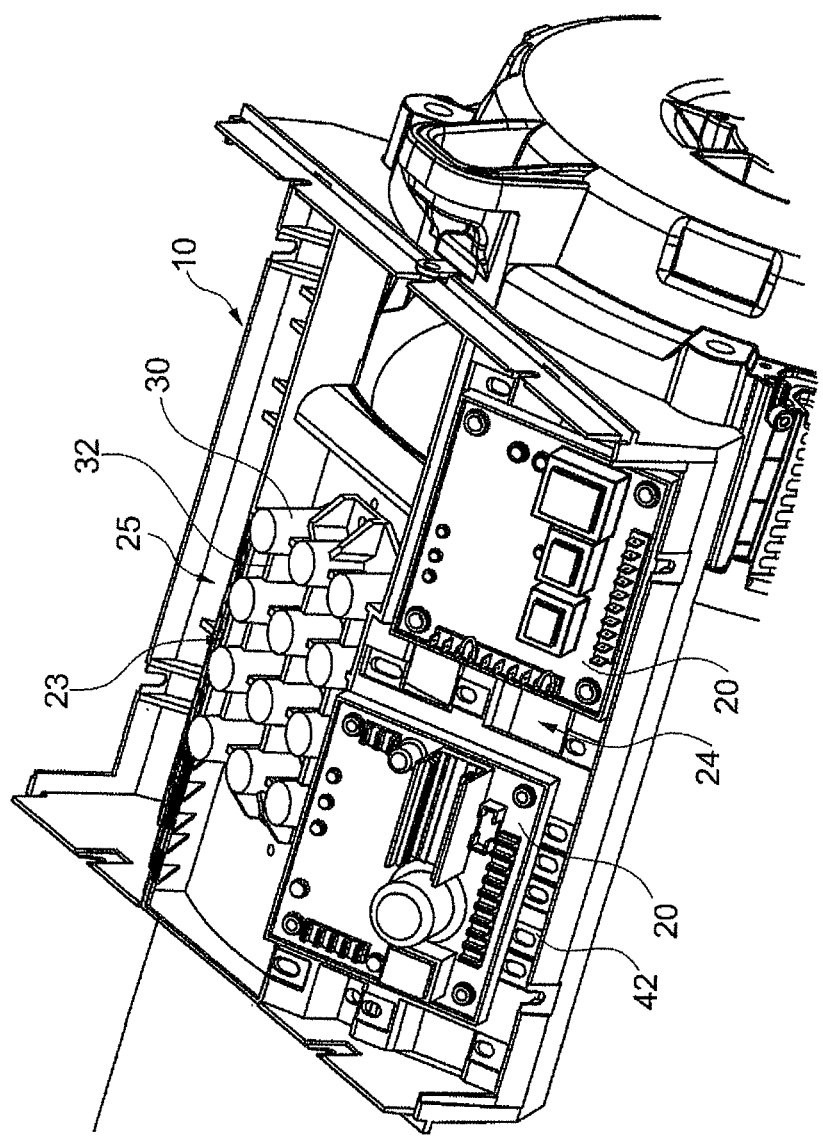
Figure 5:
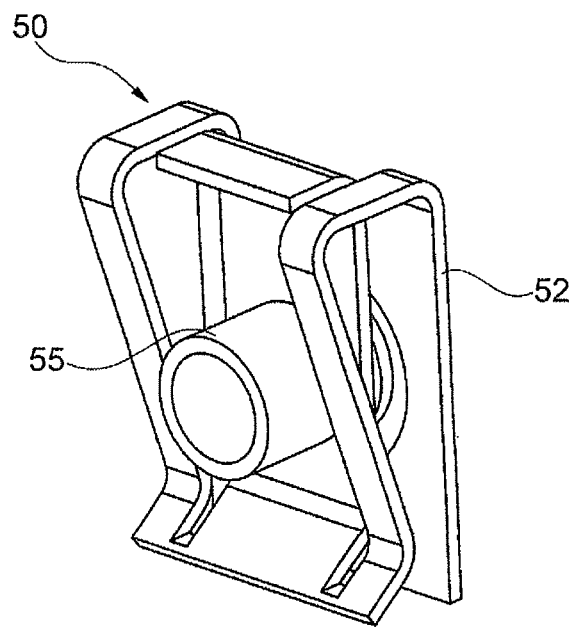
Figure 6:
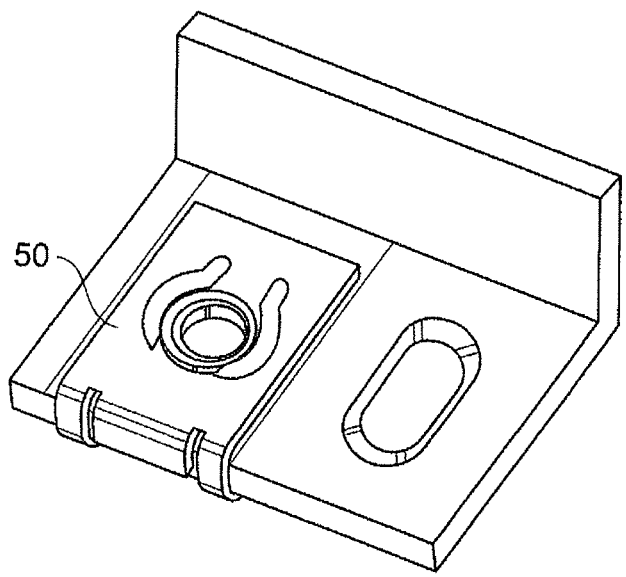

The invention may be better understood from reading the detailed description which follows of some nonlimiting embodiments thereof and from studying the attached drawing in which:

FIG. 1 is a schematic and partial perspective depiction of a terminal box according to the invention, arranged on the casing of a rotary electric machine, FIG. 2 is a view of the cover removed from the terminal box of FIG. 1, FIGS. 3A, 3B and 3C depict the base part fixed to the casing of the machine, accepting an electronic module in FIG. 3A, another electronic module in FIG. 3B, different from the one depicted in FIG. 3A, and two electronic modules in FIG. 3C, FIG. 4 depicts the base part on its own, FIG. 5 depicts a fastener on its own, and FIG. 6 depicts the fastener of FIG. 5 in position on a support element of the base part.

The electric machine 1 depicted in FIGS. 1 and 2 comprises a casing 2 on which a terminal box 3 is mounted, for example in the upper part of the machine as illustrated, although this arrangement is just one of many possible examples.

The casing 2 in the way known per se houses an electric machine stator and a rotor which rotates inside the stator about an axis of rotation X which in this instance coincides with the longitudinal axis of the machine 1.

The casing 2 may, as illustrated, comprise a body 5 to which is fitted an end cover 6 which may, as illustrated here, comprise ventilation openings 7.

In the example illustrated, the terminal box 3 covers the body 5 of the casing 2 and part of the end cover 6.

The machine 1 is, for example, an alternator, although the invention is not restricted to alternators and may also be applied to other rotary electric machines such as motors. The invention is preferably concerned with electric machines of a power of 50 kW or above.

The terminal box 3 may house one or more electronic modules 20 which for example consist of one or more regulators or variators.

Each of the modules 20 may comprise a certain number of inputs or outputs which can be connected electrically by cables, not depicted, to one another and to the internal conductors of the machine, the latter conductors being fixed to electrical connection elements 22 situated in an electrical connection zone 23.

The electronic module or modules 20 are situated in fixing zones 24 and 25, the fixing zones 24 and 25 being arranged for example respectively one on either side of the connecting zone 23, notably to the left and to the right of the latter when the machine is viewed along its longitudinal axis X.

In the example illustrated, the electrical connection elements 22 comprise threaded metal inserts which are housed in blocks 30 of material positioned, for example, as can be seen in FIG. 4, with an even spacing in the longitudinal direction and in the transverse direction.

The threaded metal inserts are preferably incorporated into the base part 10 by overmoulding. They are preferably of female type. It is thus possible for studs, not depicted here, such as hexagon socket headless screws of the Hc type of suitable number and length to be screwed into these.

In the example illustrated, the blocks 30 are arranged evenly in the longitudinal and transverse directions and form an array, for example of four rows of three consecutive blocks 30.

The blocks 30 may be joined together by ribs 32 extending for example in a grid pattern.

The electrical connection zone 23 may comprise, on each side of the blocks 30 in the longitudinal direction, lugs 36 for fixing to the casing, these being provided with at least one hole 37 through which a fastener such as a screw or a rivet can pass.

In the fixing zones 24 and 25, the base part 10 comprises support elements 42, these support elements 42 for example taking the form of pre-holed rails, running parallel to one another along the longitudinal axis X. There are preferably from 2 to 10 of these rails which are, as illustrated, advantageously connected by transverse ribs 44 moulded as an integral part with the rest of the base part 10, these transverse ribs 44 improving the mechanical integrity of the base part 10 while at the same time contributing to supporting the rails.

The base part may also comprise one or more longitudinal ribs 46.

The pre-made holes are, for example, moulded with rectangular recesses so that, as illustrated in FIG. 6, they can accommodate fasteners such as clip nuts 50, one of which has been depicted on its own in FIG. 5.

There are preferably between 10 and 100 of these pre-made holes.

The clip nuts 50 may, in the conventional way, comprise an internally threaded barrel 55 supported by a clip-like cage 52, which can be fitted onto a support element 42 in its thickness, with the barrel 55 being positioned opposite a pre-made hole.

The lateral sides 56 of the base part 10 preferably comprise partitions 69, provided with at least one hole 70 for the passage of a fastener, such as a screw or a rivet, for fixing it to the casing 2.

The support elements 42 may comprise extra pre-made holes, so that the terminal box 3 can easily accept electronic modules 20 of different sizes, in a wide variety of layouts.

Some possible layouts are illustrated in FIGS. 3A, 3B and 3C: the same base part 10 in FIGS. 3A and 3B is accepting a single module 20 whereas it is accepting two of them in FIG. 3C. In addition, this same base part 10 accepts an electronic module 20 depicted in FIG. 3A which differs, notably in terms of its size, from the one depicted in FIG. 3B. The support elements 42i, 42j, 42k and a support element that cannot be seen in FIG. 4, used for fixing the module 20 of FIG. 3A, differ from the support elements 42r and 42s used to fix the module 20 in FIG. 3B.

The base part is preferably symmetric about a longitudinal median plane containing the axis X.

For preference likewise, as illustrated, the lateral sides 56 of the base part 10 and the front and rear uprights 51 comprising housings 53 to accept clip nuts 50 used for mounting the various constituent elements of the cover 11. The lateral sides 56 may also each have a setback 72 allowing one of the lateral panels 14 and 15 to be positioned on the base part. The same is true of the front and rear sides which each have a setback 72 for positioning one of the front and rear panels 16 and 17, with the depth of these setbacks 72 corresponding substantially to the thickness of the panels.

The lateral sides 56 and the front and rear uprights 51 are moulded as one piece with the rest of the base part 10.

The support elements of the lateral sides 56 may comprise tabs 80 each provided with a hole 81, intended for the fixing of a module, and directed towards the longitudinal median plane of the base part 10.

In one layout arrangement, the fixing zone 25 and, by symmetry where appropriate, also the fixing zone 24, comprises several transverse ribs 44, which may have different widths, as well as at least one longitudinal rib 46.

The fixing zone 25 and, by symmetry where appropriate, also the fixing zone 24, may comprise at least two sub-zones for the fixing of electronic modules 20, each of the sub-zones being able to comprise its own arrangement of support elements 20. For example, the sub-zone located furthest to the right in FIG. 4 has three pre-holed longitudinal rails, whereas the sub-zone situated furthest away to the left in this same figure has just two of them, the one in the middle having no pre-made holes.

As illustrated in FIG. 4, the surfaces 42 that accept the clip nuts 50 of one rail may be adjacent to one another or alternatively may be separated from one another for example by a rib or a partition, and in a way which may potentially differ from one rail to another.

The support elements 42 situated towards the upright 51 furthest to the left in FIG. 4 are joined together by a connecting element 83 which extends in a plane perpendicular to the axis X, this connecting element 83 being moulded as one piece with the rest of the base part 10.

As can be seen in FIG. 1, once the cover 11 has been assembled, the lid 13 then covers the various panels 14 to 17 at their tops, without, however, preventing them from being individually removed.

Each lateral panel 14 or 15 may comprise a hole 60 for the passage of a screw which screws into the adjacent front or rear panel 16 or 17 in a corresponding hole 61 of this front or rear panel.

Likewise, the lid 13 has holes 63 for the passage of screws which engage in corresponding holes 65 in the front and rear panels 16 or 17. To assemble the terminal box 3, to begin with the base part 10 is fixed to the casing 2 of the machine 1, for example using screws engaged in holes 37 in the lugs 36 and possibly in the holes 70 of the base part 10.

Next, the electronic module or modules 20 can be fixed to the base part 10 using the fasteners, for example clip nuts 50, the positioning of these being chosen to make them easier to install and to make machine maintenance easier. The cables are connected using terminal clips fitted onto studs screwed into the inserts 22, and held on the studs using nuts. The studs are preferably hexagon socket headless screws of Hc type. Once the various components have been assembled inside the terminal box 3, the cover 11 can be fitted, this having for example been preassembled by screwing the lid 13 to the panels 14 to 17, then fixed to the base part 10. For preference, the various elements of the cover 11 are made of metal, but it would not constitute a departure from the scope of the present invention if the cover were produced from non-metallic elements.

If appropriate, the cover 11 can be produced as one with the various panels and the lid.

It would not constitute a departure from the scope of the present invention if various modifications were made to the example just described.

For example, the location of the electrical connection zone within the base part can be modified so that this connection zone is no longer central.

Expression such as "comprising one/a/an" must be understood as being synonymous with "comprising at least one/a/an" unless otherwise specified.

The invention claimed is:
1. A rotary electric machine comprising:
a machine casing; and
a terminal box fitted to the casing, the terminal box comprising a base part, the base part defining at least:
a fixing zone for fixing at least one electronic module, this fixing zone comprising one or more support elements for receiving fasteners for fixing the module or modules, and
an electrical connection zone, the electrical connection zone comprising at least one block of material for receiving at least one electrical connection element, the at least one electronic module being connected to electrical conductors of the rotary electric machine via the at least one electrical connection element, and the support element or elements and the block or blocks of material being moulded as a single piece with the base part.

2. The rotary electric machine according to claim 1, the support element or elements being pre-holed.

3. The rotary electric machine according to claim 2, the support element or elements comprising at least one extra hole.

4. The rotary electric machine according to claim 2, the support element or elements comprising holes distributed over substantially their entire length.

5. The rotary electric machine according to claim 1, the fasteners comprising clip nuts.

6. The rotary electric machine according to claim 1, the or at least one of the electronic modules being connected to electrical conductors of the rotary electric machine.

7. The rotary electric machine according to claim 6, the electronic module or modules being chosen from voltage regulators and speed variators.

8. The rotary electric machine according to claim 1, the connection zone comprising a plurality of blocks of material arranged at regular intervals in at least one direction.

9. The rotary electric machine according to claim 8, the plurality of blocks of material being arranged at regular intervals in two mutually perpendicular directions.

10. The rotary electric machine according to claim 1, the electrical connection element or elements comprising threaded metal inserts.

11. The rotary electric machine according to claim 10, the threaded metal inserts being overmoulded in the base part.

12. The rotary electric machine according to claim 10, the threaded metal inserts being female threaded inserts designed to accept screws or threaded studs.

13. The rotary electric machine according to claim 12, the screws or threaded studs being hexagon socket headless screws of the Hc type.

14. The rotary electric machine according to claim 1, the connecting zone being central.

15. The rotary electric machine according to claim 14, the base part defining at least two fixing zones positioned one on each side of the central connecting zone.

16. The rotary electric machine according to claim 15, the two fixing zones being positioned on the lateral sides of the base part.

17. The rotary electric machine according to claim 1, comprising a cover fixed to the base part.

18. The rotary electric machine according to claim 17, the cover comprising at least one removable individual panel that can be detached from the terminal box without fully removing the cover.

19. The rotary electric machine according to claim 17, the cover comprising front and rear panels, lateral panels and a lid, all these elements being removable relative to one another.

20. The rotary electric machine according to claim 17, the base part comprising housings to receive fasteners that fix the cover to the base part.

21. The rotary electric machine according to claim 17, the cover being made of metal.

22. The rotary electric machine according to claim 1, the base part being moulded in a thermoplastic material.

23. The rotary electric machine according to claim 1 having no external electrical plug for electrical connection.

24. A rotary electric machine comprising:
a machine casing; and
a terminal box fitted to the casing, the terminal box comprising a base part, the base part defining at least:
a fixing zone in which at least one electronic module is fixed, this fixing zone comprising one or more support elements for receiving fasteners by which the at least one module is fixed, the one or more support elements being pre-holed and comprising at least one extra-hole once the at least one module is in place, and
an electrical connection zone, the electrical connection zone comprising at least one block of material for receiving at least one electrical connection element,
the one or more support elements and the at least one block of material being moulded as a single piece with the base part.

* * * * *